(12) United States Patent
Yogerst et al.

(10) Patent No.: US 12,393,651 B2
(45) Date of Patent: Aug. 19, 2025

(54) SYSTEMS AND METHODS FOR VALIDATING AND EXTRACTING DATA DYNAMICALLY FROM IMAGES OF IDENTIFICATION DOCUMENTS

(71) Applicant: Capital One Services, LLC, McLean, VA (US)

(72) Inventors: Shannon Yogerst, New York, NY (US); Tania Cruz Morales, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 280 days.

(21) Appl. No.: 18/066,514

(22) Filed: Dec. 15, 2022

(65) Prior Publication Data

US 2024/0202294 A1 Jun. 20, 2024

(51) Int. Cl.
*H04L 29/00* (2006.01)
*G06F 21/31* (2013.01)
*G06V 10/74* (2022.01)
*G06V 10/82* (2022.01)
*G06V 30/262* (2022.01)

(52) U.S. Cl.
CPC ............ *G06F 21/31* (2013.01); *G06V 10/761* (2022.01); *G06V 10/82* (2022.01); *G06V 30/274* (2022.01)

(58) Field of Classification Search
CPC ....... G06F 21/31; G06V 10/761; G06V 10/82
USPC .......................................................... 726/19
See application file for complete search history.

(56) References Cited

U.S. PATENT DOCUMENTS

2014/0281945 A1* 9/2014 Avni ................. H04L 63/12
715/268
2020/0210562 A1* 7/2020 Tussy ................. G06V 40/172

* cited by examiner

*Primary Examiner* — Jeffrey C Pwu
*Assistant Examiner* — Michael D Anderson
(74) *Attorney, Agent, or Firm* — Foley & Lardner LLP

(57) ABSTRACT

System and methods for extracting data from and authenticating digital images of documents. The system may receive first digital image data. The system may determine a first image type of the first digital image data. The system may determine a first version identifier based on the first digital image data. The system may determine a first ruleset. The system may determine a first set of pixel coordinate ranges for authenticating digital images. The system may determine a first authentication status for the first digital image. The system may determine a second portion of the first digital image at a second set of pixel coordinate ranges. The system may compare a first portion to the second portion. The system may determine a second ruleset. The system may update the image ruleset database to include the second ruleset.

20 Claims, 4 Drawing Sheets

| Image Type | Version ID | Authentication Element | $x_1$ | $x_2$ | $y_1$ | $y_2$ |
|---|---|---|---|---|---|---|
| Province Driver's License | 2003 | Name Field | 25 | 60 | 30 | 40 |
| | | Date of Birth Field | 25 | 60 | 45 | 55 |
| | | Expiration Date Field | 25 | 60 | 60 | 70 |
| | | Verification Marker | 80 | 90 | 10 | 30 |
| | 2019 | Name Field | 25 | 60 | 30 | 40 |
| | | Date of Birth Field | 25 | 60 | 45 | 55 |
| | | Expiration Date Field | 10 | 45 | 60 | 70 |
| | | Verification Marker | 60 | 70 | 70 | 90 |
| National Identification | 2015 | Name Field | 20 | 55 | 40 | 50 |
| | | Date of Birth Field | 20 | 55 | 55 | 65 |
| | | Expiration Date Field | 20 | 55 | 70 | 80 |
| | | Verification Marker | 80 | 90 | 5 | 60 |

FIG. 2

SYSTEMS AND METHODS FOR VALIDATING AND EXTRACTING DATA DYNAMICALLY FROM IMAGES OF IDENTIFICATION DOCUMENTS

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence often relies on large amounts of high-quality data. The process for obtaining this data and ensuring it is high-quality is often complex and time-consuming. Second, despite the mainstream popularity of artificial intelligence, practical implementations of artificial intelligence require specialized knowledge to design, program, and integrate artificial intelligence-based solutions, which limits the amount of people and resources available to create these practical implementations. Finally, results based on artificial intelligence are notoriously difficult to review as the process by which the results are made may be unknown or obscured. This obscurity creates hurdles for identifying errors in the results, as well as improving the models providing the results. These technical challenges present an inherent problem with attempting to use an artificial intelligence-based solution in validating and extracting data dynamically from images of identification documents received over computer network communications.

SUMMARY

Methods and systems are described herein for novel uses and/or improvements to data validation and extraction from document images. As one example, methods and systems are described herein for dynamically validating and extracting authentication data, such as identification names, numbers, and security features, from images of identification documents, even when design styles or identification document types differ as they are received over time.

Existing systems for validating identification documents, for example, require static pre-existing rulesets to apply to only specific images. For example, conventional systems require predetermined validation information and/or rules regarding a particular style of identification document, including where identity/authentication information may lie, and what security features may need to be validated. Thus, a conventional system may only handle a small, static subset of possible document types, and may require manual updating of authentication handling rules where a document type is updated, refreshed, or added. Furthermore, there is no conventional mechanism for dynamically and/or in real-time generating rulesets based on received identification documents.

One solution for dynamic, and/or in real-time, generation of rulesets would be the use of artificial intelligence models. However, adapting artificial intelligence models for dynamic receipt and processing of identification document data may face several technical challenges, such as a lack of information regarding document types, authentication elements, and security features within new document or identification types. For example, as noted above, artificial intelligence models require abundant training data, which may be scarce as new identification documents may not have been previously seen or described. For example, identification documents from new issuing authorities (e.g., a driver's license from a newly formed country) may lack any training data and as such, no artificial intelligence model may be trained (or be capable of being trained) on any contextual information regarding these documents. Artificial intelligence models may not have a way to learn from newly received documents, such that conventional systems may not be able to flag and analyze a new document type for future authentication even if they used artificial intelligence models. For example, a conventional system may not be capable of determining sufficient information for the processing of newly received document types, such as which regions of a document may include which information, or which security features must be present for verification of the document.

To overcome these technical deficiencies in adapting artificial intelligence models to validate and extract data from image data relating to documents, such as driver's licenses, where data formats may differ over time, methods and systems disclosed herein may determine a ruleset that corresponds to the type of document within the image, for validating and parsing the image, and update this ruleset over time. Furthermore, to overcome the technical challenges discussed above with respect to the lack of training data for artificial intelligence models, the system may dynamically detect instances of new identification documents and dynamically create new rulesets for processing these instances and dynamically feedback these updates into the artificial intelligence model. As such, the system trains itself in an iterative and ongoing manner such that the lack of prior training data for new identification documents is not necessary.

The system may subsequently determine whether the ruleset matches the image, extract parameters and/or authentication details accordingly, and, in some embodiments, encrypt these parameters for further validation. For example, the system may receive a document that does not fit existing rulesets and dynamically learn where key features may be on the document. The system may determine a new ruleset corresponding to these key features and insert them in a database accessible to the system for further use (e.g., for further training of artificial intelligence models for document classification and authentication). In some embodiments, the system may enable authentication of the new ruleset externally, on demand. Accordingly, the methods and systems provide the practical benefit of dynamically validating and determining user information even when data formats change over time, while ensuring its authenticity and maintaining user security and privacy.

In some aspects, the system may receive digital image data over a computer network where the first digital image data includes a first digital image. The system may determine a first image type of the first digital image data and a first version identifier based on the first digital image data. Based on the first image type and the first version identifier, the system may determine a first ruleset, from an image ruleset database, for processing the first digital image data, wherein the image ruleset database includes a plurality of rulesets for dynamically validating and extracting inputted data corresponding to predetermined image types and predetermined version identifiers. The system may determine, based on the first ruleset, a first set of pixel coordinate ranges for authenticating digital images having the first image type and the first version identifier. Based on determining the first ruleset, the system may determine a first authentication status for the first digital image based on processing a first portion of the digital image at the first set of pixel coordinate ranges. Based on the first authentication status, the system may determine a second portion of the first digital image at a second set of pixel coordinate ranges, wherein the second set of pixel coordinate ranges indicates the second portion of the first digital image that includes authentication data. The system may compare the first portion to the second portion. Based on comparing the first portion to the second portion, the system may determine a second ruleset for processing the first digital image data. The system may update the image ruleset database to include the second ruleset.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 shows an illustrative diagram for an image ruleset database to be used in verifying and extracting authentication data from an identification document image, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
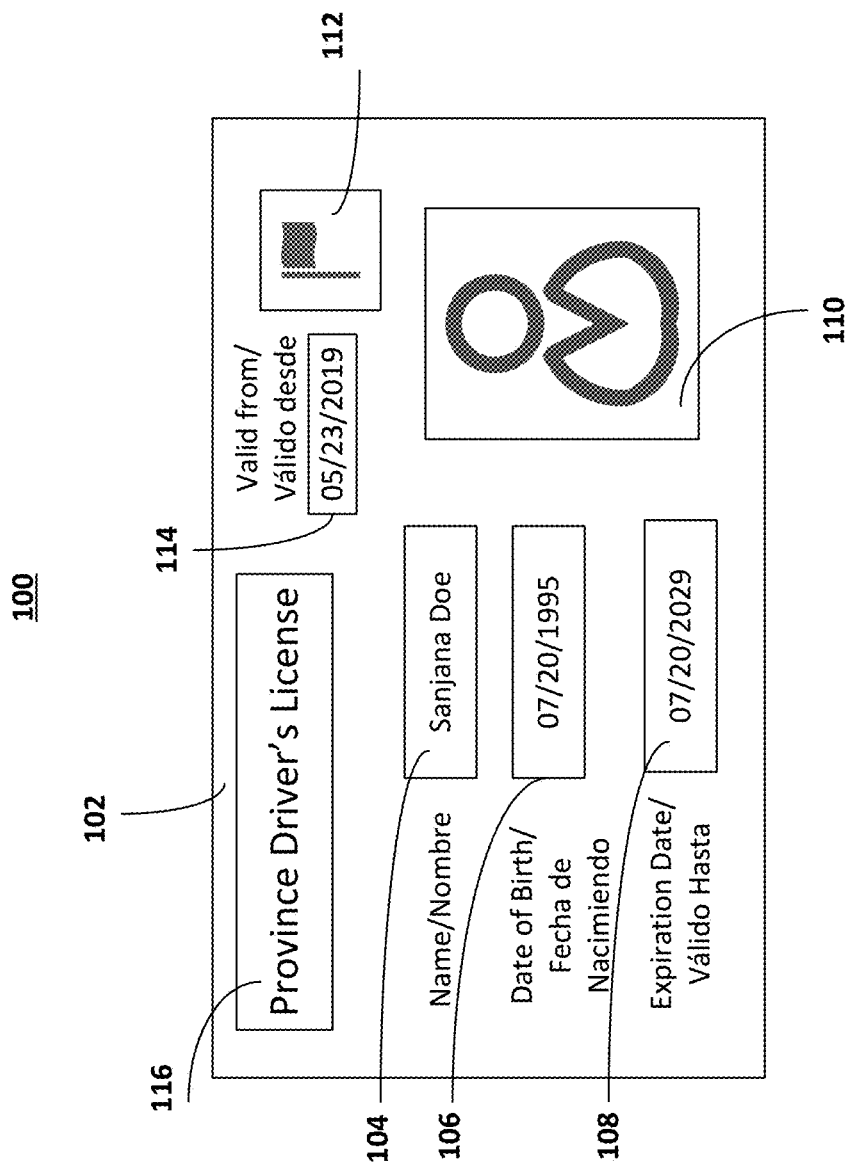
FIG. 1 shows an illustrative diagram for an image of an identification document, from which data may be dynamically validated and extracted, in accordance with one or more embodiments.

FIG. 1 shows an illustrative diagram for an image of an identification document, from which data may be dynamically validated and extracted, in accordance with one or more embodiments. For example, image 100 may include a digital picture of driver's license 102, or any other document (e.g., identification documents, such as passports, identity cards, or security badges), with data that may require authentication (e.g., authentication data). For example, an identification document may enable authentication of a person through inclusion of name field 104, date of birth field 106, and/or photo identification 110. By using one or more of these elements (e.g., authentication elements), the system may deduce biographical or other authentication information regarding a user or entity, thereby enabling validation of the document holder. Additionally or alternatively, identification documents (e.g., driver's license 102) may include information regarding the validity of the document itself (e.g., authentication status identifiers). For example, an identification document may include additional security features (e.g., additional authentication status identifiers) ensuring the validity of the document itself, such as for forgery protection. In some embodiments, authentication status identifiers may include security data, such as a serial number, an expiration date field 108 and/or issue date field 114 (e.g., a "valid from" date field), which enables verification of the document and document holder in combination (e.g., against a database of document holder information). Other authentication status identifiers may include a watermark, such as icon 112 on driver's license 102, which enables verification of the manufacture of the document by an authorized actor. By considering and extracting any useful authentication data, such as authentication elements and authentication status identifiers, the system may accurately verify both the identity of a document holder, as well as the authenticity of the document itself respectively, thereby improving the handling and processing of secure documents, such as identification documents.

The system may be used to extract and validate authentication data from digital images of documents, such as identification documents. As referred to herein, an "identification document" (e.g., an identity document) may include a document that may be used to verify a person's identity, and may include information such as a name, date of birth, and other biometric information, such as an age, address, identification number, card number, gender and/or citizenship. For example, identity documents may include one or more document types. As referred to herein, a document type may include an identifier or indicator of a medium on which an identity information on an identification document may be presented. For example, document types may include passports, passport cards, driver's licenses, student identification cards, workplace/employment badges, and national identity cards, and may be issued by one or many issuing authorities. In some embodiments, an identification document may include a physical card, token, or booklet, with or without electronic features (such as smart chips, near-field communication antennae, and/or computer-readable codes). Additionally or alternatively, identification documents may be electronically generated and/or displayed on a digital screen (e.g., biometric and identity information displayed on a mobile phone or another device). Identity documents may include sensitive information that may be liable to theft (e.g., identity theft), counterfeit/forgery, misuse, breaches of privacy, or national security concerns. As such, identity document verification is paramount to maintaining the security and utility of identity cards.

The system may determine issuing authorities (e.g., for identity documents or images). As referred to herein, an "issuing authority" may include any entity with an ability, jurisdiction, or agency to generate and/or authenticate identity cards. For example, issuing authorities may include governments (e.g., national, state, provincial, or other local governments). For example, state governments may act as issuing authorities for driver's licenses and other associated identification documents. In some cases, issuing authorities may include other institutions, such as schools, universities, colleges, government branches (e.g., departments of motor vehicles), military branches, or employers, such as in the case of student or employee identification documents. In the case of medical identification documents, such as birth certificates, issuing authorities may include hospitals, clinics, or doctors. The system may identify issuing authorities, as issuing authorities may have control over design standards or other attributes of identification documents that may be useful for document verification or authentication. For example, issuing authorities may have control over what information is included on an identification document, including which security features the document may possess. Thus, identification of issuing authorities enables the system to better validate images of documents against security standards and authentication data.

The system may determine or extract information regarding design standards. As referred to herein, a "design standard" may include information or guidelines regarding the characteristics and/or placement of features suggested or required by an issuing authority within a given document. For example, design standards may include information regarding the physical nature of the document, such as dimensions (e.g., width, height, or thickness), color palette, and/or medium (e.g., a booklet, a card, or a badge). Design standards may specify information or data that may be included within the document (e.g., authentication data, such as names, dates of birth, or identification serial numbers). Design standards may specify the placement of such information, including security features that may protect against forgery, theft, and/or fraud. By determining or extracting information on the basis of design standards, the system may have information regarding the data that may be extracted in order to validate the identification document, as design standards may dictate the information required to confirm document authenticity.

The system may determine security features within an identification document. As referred to herein, a "security feature" may include elements of a document that may lead to improved security, such as tamper-proofing, forgery/counterfeit mitigation, and ease of authentication. For example, security features may include signatures or photographs of the user, or may include design elements such as color-shifting designs (where colors may change with shifting or rotation). In some embodiments, security features may include designs, images, icons, seals, logos, or other elements that may or may not be tactile and/or visual. In some embodiments, the system may identify security features through digital image data, in order to verify the authenticity and/or validity of an identification document. Information about security features may enable this authenticity verification process. However, as security features may change over time (e.g., vary with design standards), the system may track changes to security features and/or design standards, enabling verification of document authenticity even in dynamic environments.

The system may extract and verify identification data from digital images of identification documents. As referred to herein, "identification data" may include any information that may aid in identifying a holder of an identification document. For example, identification data may include a cardholder's name, date of birth, age, gender, place of birth, signature, and/or identification number (e.g., a serial number). In some embodiments, identification data may include biometric data, such as height and weight information, as well as facial structure data (e.g., in the form of a portrait image). In some embodiments, identification data may include fingerprints (e.g., embossed into the design of the document, or stored electronically within a smart chip). The system may utilize identification data to verify the authenticity and validity of an identity document. For example, the system may cross-reference identification data with databases or other documents submitted by a user to ensure that information matches.

The system may determine document authenticity for an identification document. As referred to herein, "document authenticity" may include any measure or determination of whether a document is genuine, from the source/issuing authority that is claimed, and/or original. For example, document authenticity may include a determination that it is more likely than not that a document was issued by an issuing authority listed on the card and/or that the information on the card is accurate. Document authenticity may include a determination of whether security features required by design standards are present, as well as whether all identification data that is required is listed. As determining document authenticity is paramount to protecting against security, fraud and privacy concerns, the system may ensure that a received document is likely compliant with relevant security features and authenticity requirements, thereby streamlining any further verification processes.

The system may determine whether a ruleset is valid. As referred to herein, "validity of a ruleset" may include a determination of whether a particular ruleset (e.g., a description of design standards, or required security features and/or identification data within a document) is consistent with a given document. For example, the system may compare a document's design with design standards described directly by the issuing authority and make a determination as to whether the document is compliant. Thus, the system may determine whether a ruleset, based on the document's actual design, is representative and consistent with stated authentication guidelines or standards. By doing so, the system may learn from and validate document designs that are received in a generalizable manner that may be useful for processing further received images of documents.

FIG. 2 shows an illustrative diagram for an image ruleset database to be used in verifying and extracting authentication data from an identification document image, in accordance with one or more embodiments. For example, FIG. 2 depicts image rule database 200, which may include information regarding rulesets (e.g., rulesets 210-214). Each ruleset may be associated with image type field 202, version identifier field (e.g., version ID field 204), authentication element field 206, and fields 208, corresponding to sets of pixel coordinate ranges describing positions of authentication elements.

By including such information, image rule database 200 enables the system to store data regarding the designs and features of various documents (e.g., identification documents) whose digital images may be received. For example, image rule database 200 may include information regarding the authentication elements within a provincial driver's license, such as the position of the corresponding name field, date of birth field, expiration date field, as well as verification markers (e.g., security features or watermarks). By doing so, the system may evaluate whether a document, corresponding to a digital image, may be authentic or not. For example, the system may compare information or features within sets of pixel coordinate ranges corresponding to the digital images in order to determine whether required authentication elements (e.g., a verification marker) are present. The system may also utilize the image ruleset database to determine areas in which to extract information (e.g., name, date of birth, or other biometric information). Thus, the system may authenticate a holder of the document corresponding to the digital image as well. The system may update image ruleset database 200 based on new information (e.g., information from an issuing authority) or from received digital images of new documents (e.g., a document from an issuing authority, such as another country, that has previously not been encountered). For example, the system may append the image ruleset database 200 with an entry for a new version identifier if a driver's license design standard changes (e.g., the placement of the name or verification marker changes).

The system may receive digital image data. As referred to herein, "digital image data" may include data related to digital images, including digital images themselves, metadata regarding the image (e.g., a number or dimensions of pixels, a global positioning system (GPS) coordinates of the location of the image's capture, or a device identifier from which the picture was taken). In some embodiments, digital image data may include metadata relating to the object or document that is imaged. For example, digital image data may include an identifier of the document type (e.g., an indication of the document being a passport, driver's license, etc.), as well as a version identifier (e.g., an identifier of design standards or a serial number prefix indicating a version for the document). Receiving digital image data enables the system to complete verification or authentication tasks remotely, even when the original document is inaccessible. For example, receiving digital image data enables the system to verify the identity of a user using a secure mobile application, without requiring the user to physically present documents. By including relevant metadata within the digital image data, the system may better verify and validate the digital image itself, as well as receive information (e.g., related to design standards or issuing authorities) that may aid in processing or extracting relevant data from the image.

The system may receive digital image data. As referred to herein, a "digital image" may include a data structure (e.g., an image) that comprises picture elements (hereafter referred to as "pixels"), each with finite, discrete quantities of numeric representation corresponding to intensity, gray level, or any other visual property. In some embodiments, digital images may be parametrized by spatial coordinates (e.g., Cartesian coordinates, denoted by x or y for each orthogonal dimension). In some embodiments, a digital image may be of vector type or of raster type. Digital images may be stored in various data formats, such as in Joint Photographic Experts Group (JPEG), Graphics Interchange Format (GIF), or Portable Network Graphics (PNG) formats. Images may be captured by digital devices, such as digital cameras, mobile devices, computers, laptops, or scanners. Digital images may be associated with digital image data, as discussed above. In some embodiments, the system may compress, decompress, crop, retouch, or otherwise perform operations on digital images, for example, to improve clarity, improve data processing, or to standardize the image. Digital images may correspond to images of documents (e.g., images of driver's licenses, passports, or other documents). In some embodiments, digital images may include images of text (e.g., numeric, alphabetical, or alphanumeric information). By receiving digital images, the system may prepare and process the images electronically and automatically, in a manner that may be suitable for input into machine learning models, optical character recognition, or other operations. Additionally, as digital images are easy to capture in a portable setting (e.g., through mobile devices) and subsequently transmit electronically, digital images may best enable users to submit, for example, images of identification documents, even when physically away from the verifying entity.

The system may determine image types corresponding to the digital image data. As referred to herein, an "image type" may include any classification or characterization of a digital image, digital image data, or object/document captured within the digital image. For example, an image type may include information regarding the image format of the digital image. In some embodiments, an image type may include information regarding the type of document captured within the image, such as whether the digital image is one of a passport, driver's license, or identity card. An image type may include further information, such as regarding the issuing authority of a given document. For example, an image type may specify that a given digital image corresponds to a driver's license of a particular state (e.g., a California Driver's License). In some embodiments, the image type may be included as part of digital image data, such as through a form filled out by a user submitting the digital image. For example, the system may determine an image type by parsing (e.g., extracting or processing) a title field that is visible in the document (e.g., title field 116, as shown in FIG. 1). By receiving or otherwise determining an image type, the system may determine rules for authenticating and extracting data with respect to the received digital image. As such, the system may better verify the authenticity of both the presented document itself, as well as the information upon the document.

The system may determine a version identifier corresponding to the digital image data. As referred to herein, a "version identifier" may include any indication of a version, variation, or modification of a given document or image. A version identifier may include an indication of a time-based marker of design standards for a given imaged document. For example, a version identifier may include an indicator of a series or time period in which given images or documents may have been manufactured with similar standards, such as an indicator of a range of years where driver's licenses may have had the same design and security features. A version identifier may include a serial number prefix, wherein the serial number prefix indicates the design standard or other information pertaining to the given document. By determining the version identifier corresponding to a digital image, the system may record and track how design standards (e.g., corresponding authentication elements, authentication data, or security features) may differ over time, or over different versions of the same document. Thus, the system may more accurately determine how to extract authentication data, as well as verify the associated document, even where the same document type may have different standards or designs. Additionally, the system may dynamically adapt to changes in document standards thereby streamlining the process of validation or verification of images received subsequently.

The system may determine a ruleset based on the digital image type and version identifier. As referred to herein, a "ruleset" may include any criteria, conditions, requirements, or specifications regarding an image or a document type. For example, a ruleset may include a list of features that the document may exhibit (e.g., any authentication data or authentication elements 104-114, such as a name field, a date of birth field, an expiration date field, or a verification marker field). A ruleset may also include information regarding the location or form of these features, such as a set of pixel coordinate ranges corresponding to an expected location for a given feature. A ruleset may include information regarding the form or characteristics of a given element or feature. For example, a ruleset may include information about the color of a verification marker, or the font style of a given field of text. In some embodiments, a ruleset may correspond to a particular image type (e.g., a document type, such as a passport) and version identifier (e.g., a particular series or design standard for the given image type). By including this information within rulesets, the system may determine how to access or extract authentication data (e.g., authentication elements or authentication status identifiers), as well as what information to expect or detect in order to determine an authentication status. By including rulesets particular to document types or versions, the system may ensure that documents may be treated differently depending on the respective design standards or security features. For example, the system may generate new rulesets based on any changes that are detected to these design standards or security features, thereby adapting the system to handle these new document types or document versions.

Rulesets may include sets of pixel coordinate ranges. As referred to herein, "pixel coordinate ranges" may include an indication or identification of coordinates of pixels within an image corresponding to a feature (e.g., corresponding to a portion of the digital image where a feature may be expected). For example, a pixel coordinate range may include a minimum value (e.g., as denoted by subscript 1 in fields 208, as shown in FIG. 2) and a maximum value (e.g., as denoted by subscript 2 in fields 208, as shown in FIG. 2). In some embodiments, a pixel coordinate range may be denoted by an average value and a range spanning either side of the average. A set of pixel coordinate ranges may include pixel coordinate ranges in each and/or every relevant dimension for a given digital image. For example, a set of pixel coordinate ranges may include a minimum and maximum value corresponding to x and y dimensions (e.g., $x_1$, $x_2$, $y_1$, and $y_2$, as shown in fields 208 in FIG. 2). By including more than one dimension, the set of pixel coordinate ranges may precisely indicate a portion of a two-dimensional digital image. In some embodiments, sets of pixel coordinate ranges may be represented by vectors or arrays corresponding to each minimum and maximum for each dimension of the digital image. In some embodiments, pixel coordinate ranges may not be expressed in Cartesian coordinates (e.g., in polar coordinates). The system may shift pixel coordinate ranges through processing in order to align digital images that may be misaligned or misstructured. By including sets of pixel coordinate ranges in rulesets, the system may determine from which portions of the image to extract information for a given document type and version. As referred to herein, a "portion" of a digital image or digital image data may include any part of the digital image (e.g., as defined or described by a set of pixel coordinate ranges). In some embodiments, a portion may have any shape, such as rectangular, circular, or free-form. Additionally or alternatively, the system may determine authentication status based on the presence or absence of a given feature within the relevant set of pixel coordinate ranges, thereby enabling the system to verify the authenticity or accuracy of a given digital image that corresponds to a document.

The system may access, store, generate, or retrieve data from an image ruleset database. As referred to herein, an "image ruleset database" may include an organized collection of data (e.g., a data structure) that stores rulesets associated with images or image data. In some embodiments, an image ruleset database may include rulesets (as described above), where each ruleset may correspond to an image type and/or version identifier. For example, FIG. 2 illustrates image ruleset database 200, which may store information regarding rulesets for province driver's licenses or national identification cards, including where relevant authentication data (e.g., authentication status identifiers, such as verification markers, or authentication elements, such as names, may be in a relevant digital image). By recording rulesets within an image ruleset database, the system may learn from past authentication and data extraction operations and may leverage this information for future authentication decisions. For example, the system may record the location of fields corresponding to a name, date of birth, and verification marker on one type of document and a respective version. The system may then apply these rules to subsequent documents in the cases where these documents are determined to have the same document type and version identifier. Thus, the system may dynamically handle, extract data from, and authenticate received documents, by referring to and/or modifying the image ruleset database.

The system may, based on the digital image data and/or rulesets, determine authentication statuses. As referred to herein, an "authentication status" may include an indication of the validity, authenticity, genuineness, or accuracy of a digital image, an object/document of which a digital image is taken, or the information associated with the object/document or digital image. For example, authentication status may correspond to whether the digital image itself is falsified or digitally altered in any way (e.g., through an image editing software, such as Photoshop). In some embodiments, the system may process a received digital image and associated metadata within the digital image data and determine whether the digital image has been edited (e.g., by detecting vector graphics superimposed upon the image). Authentication status may include an indication of whether an object or document that is pictured within a digital image is authentic or genuine. For example, the system may detect the modification or lack of a verification marker (e.g., a security mark, or another security feature), and determine, as a result, that the document is fake. In some embodiments, the system may determine that information may be in the wrong position, such as a name field being misaligned, or a verification marker being rotated with respect to the expected orientation. In these cases, the system may determine that the document is falsified or forged and generate an authentication status based on this determination.

Alternatively or additionally, the system may determine an authentication status that is an indication that there are no detectable issues with the document. For example, the system may determine that all required information fields and all required security features are present. Upon this determination, the system may generate an authentication status that reflects that no issues with the imaged document were detected. In some embodiments, the system's authentication status may reflect an indication of the accuracy or validity of the data displayed on the document. For example, the system may determine a name field, a date of birth field, an expiration date field, and/or a document serial number field, and compare these fields with respect to a database or other data from other sources. Based on this comparison, the system may determine an authentication status related to whether the information from the document matches this other information from other sources. In some embodiments, the authentication status may include an indication of why or how this authentication status was determined. By determining an authentication status, the system enables dynamic processing of data from the document and, in response, dynamic validation of a document. This process enables validation of documents, including relevant security features and biometric information, based on images of data, without the need for physical copies of such documents.

The system may determine an authentication status based on authentication data. As referred to herein, "authentication data" may include any data that may contribute to a determination of validity, authenticity, genuineness, or accuracy of a digital image, an object/document of which a digital image is taken, or the information associated with the object/document or digital image. For example, authentication data may include information directed towards the digital image (e.g., digital image data) that may lead to determination of authentication status. For example, authentication data may include metadata that describes when or how a received digital image has been modified or forged. In some embodiments, authentication data may include information regarding the authenticity of a document itself. For example, authentication data may include security data (such as authentication status identifiers), including security features, such as validation markers, within the document. Alternatively or additionally, authentication data may include information that may enable a determination of the accuracy of data on the imaged document, and may be determined using optical character recognition. For example, authentication data may include the name, date of birth, expiration date, "valid from" date, or any other information extracted from the corresponding fields in the document. By extracting authentication data from the digital image data, the system may determine whether the digital image and any associated information may be validated, thereby enabling authentication of documents even when physical copies of documents are unavailable or inaccessible.

Authentication data may include security data. As referred to herein, "security data" may include any information that may enable a determination of the authenticity, genuineness, or authentication status of a document itself (as opposed to the authentication status of a digital image, or a document holder's identity information). For example, security data may include authentication status identifiers relating to an imaged document. As referred to herein, "authentication status identifiers" may include any markers, identifiers, indications, or characteristics of the document that are deemed a requirement for a determination of a valid authentication status. For example, an authentication status identifier may include watermarks that are visible on the image that are deemed to be present on all valid driver's licenses. Other authentication status identifiers may include logos, icons, seals, or engravings that must be present (e.g., in a particular location on the card) for authentication. In addition to authentication status identifiers, security data may include other requirements that a document must exhibit for authenticity to be verified. For example, security data may include a card serial number, which may be processed against a checksum or cross-referenced against a list of acceptable values. Thus, security data may include information that may be checked against authentication conditions. By determining, extracting, or detecting security data, including authentication status identifiers, the system may determine the validity or authenticity of a document itself, by comparing this security data with any requirements or rules with which the document must comply. As a result, the determination of security data streamlines the process of verifying a received document.

The system may determine authentication conditions based on rulesets. As referred to herein, an "authentication condition" may include any condition, criterion, or requirement relating to authentication of a document. For example, an authentication condition may include a requirement that a particular security feature (e.g., a verification marker or a watermark) must be present in order for verification of the document. In some embodiments, an authentication condition may relate to security data that must be valid, such as an expiration date that indicates that the document is still valid, or that the current date is past the issue date of the document. The system may extract or deduce authentication conditions from a ruleset, such as from information regarding the placement of any required security features. By comparing security data with authentication conditions, the system may determine whether the document possesses all the required security features as stated by the authentication conditions, thereby enabling authentication and verification of the document.

The system may determine authentication elements in order to determine an authentication status. As referred to herein, an "authentication element" may include any information relating to the identity or verification of a document holder. For example, an authentication element may include name field 104, date of birth field 106, and/or photo identification 110, as shown in FIG. 1. In some embodiments, the system may extract information associated with an authentication element through optical character recognition of the portion of the image corresponding to the relevant field. For example, the system may utilize a ruleset, such as a ruleset stored within image ruleset database 200, in order to determine a set of pixel coordinate ranges corresponding to a given authentication element. The system may subsequently refer to the corresponding region on the digital image, and utilize optical character recognition to extract the relevant authentication element. In some embodiments, the system may compare the authentication element with an expected value (e.g., from a database or another image of another identity document), thereby enabling the system to verify the identity of the document holder. For example, the system may parse the document's name field and date of birth field to check whether these values match the actual name and/or date of birth of the document holder on file. Thus, by extracting authentication elements and associated information from a digital image of a document, the system may better verify the integrity of the document and document holder.

The system may validate a ruleset by generating a validation request. As referred to herein, a "validation request" may include any signal, message, or command to validate a given ruleset. A validation request may include a ruleset itself (e.g., a ruleset as shown in image ruleset database 200, in FIG. 2). For example, the validation request may include a summary of sets of pixel coordinate ranges, along with the associated authentication element or authentication status identifier. The system may transmit the validation request to a server, for example, which may verify whether the authentication elements and placement are consistent with, for example, published rules or legal requirements. For example, in the event that a state or province changes design standards, the system may detect a change in a ruleset based on a received digital image of the new document style and generate a validation request with these updated rules in order to verify them. In response, the system may receive a validation message. As referred to herein, a "validation message" may include a message indicating the validity of a ruleset. For example, the validation message may state that the detected rules are indeed consistent with a state's new design standards for a driver's license. In some embodiments, the validation message may include modifications or updates to the ruleset based on published design standards, for example. By enabling the system to validate newly detected design standards, the system may update rulesets based on received documents and verify that these rulesets are consistent with any legal or security requirements.

The system may utilize an optical character recognition (OCR) model. As referred to herein, an "optical character recognition model" may include a model that processes and/or recognizes characters from images. For example, an OCR may include matrix matching, wherein an image of a character is compared to a stored glyph on a pixel-by-pixel basis. In some embodiments, OCR may utilize feature extracting, where glyphs may be decomposed into features. In some embodiments, the OCR model may include machine learning techniques, such as neural networks or computer vision-based techniques. By utilizing an OCR model, textual and numerical features may not only be detected, but processed as well. Thus, OCR enables the system to extract security and authentication data dynamically from the image without human intervention, thereby streamlining the process of validating a document and corresponding document holder information.

In some embodiments, the system may detect a title text string (e.g., using OCR). As referred to herein, a "title text string" may include any string of text that may include information about the document's type and/or version. For example, a title text string may include field 116 in image 100, as shown in FIG. 1. A title text string may describe the nature and/or type of the document. In some embodiments, the title text string may include information regarding an issuing authority for the document. For example, a title text string may specify that a particular document is a "California Driver's License." Thus, the system may deduce that the document was issued by the California state government, as well as that it is a driver's license. In some embodiments, the system may detect whether a text field is a title text string using a natural language processing model. By determining the title text string, the system may categorize a given digital image of a received document and determine a relevant ruleset with which to process the document accordingly. For example, based on determining a document type from the title text string, the system may search for rules within the ruleset stating the location of authentication data on the document, thereby enabling the system to further validate any such information. Thus, the title text string provides useful information for the system in order to improve the efficiency and effectiveness of data extraction and validation of images of received documents.

The system may utilize an image recognition convolutional neural network model in order to determine a document type and/or version. As referred to herein, an image recognition convolutional neural network model may include an artificial neural network that may be applied to analyze visual images. Convolutional neural networks may include convolutional layers, pooling layers, channel max pooling, ReLU layers, fully connected layers and/or loss layers, and may include an input layer, one or more hidden layers, and an output layer. In some embodiments, the image recognition convolutional neural network may include feed-forward neural networks. The image recognition convolutional neural network may take, as input, a tensor, and may return a classification, in some embodiments. By utilizing an image recognition convolutional neural network model, the system may analyze an image of documents based on prior received data and classifications, thereby improving the quality of predictions of document types and/or versions. Additionally, utilizing a model improves efficiency and reduces classification bias, as documents do not require manual labeling by human labelers; thus documents may be handled dynamically, as they are received.

In some embodiments, the system may determine an issue year for the document. As referred to herein, an "issue year" may include a year from which a document was manufactured, issued, or deemed valid. For example, the system may determine an issue year from a field marked as "Valid from" or "Issue date" on a document. In some embodiments, an issue year may be utilized to determine the version of a document. Issuing authorities may update document designs over time. Thus, an issue year may be useful for determining which version (and, therefore, which design standards and, subsequently, which ruleset), may be applied to a given document. Therefore, by determining an issue date, the system may track and monitor version types for received documents, and update any rulesets accordingly.

In some embodiments, the system may determine a vector representation for a digital image. As referred to herein, a "vector representation" may include a data structure that represents the digital image, which may include arrays, vectors, tensors, or matrices. In some embodiments, a vector representation may include a matrix of coordinates and values corresponding to individual pixel colors, brightness, or other attributes. For example, a vector representation may utilize a coordinate system that corresponds to the sets of pixel coordinate ranges, and may define a value at each pixel (e.g., a bitmap). In some embodiments, the system may further process a digital image to prepare it for entry into the image recognition convolutional neural network model (e.g., by creating a tensor comprising vector representations of multiple images to be classified at the same time). By generating a vector representation, the system may standardize the format of the digital image, as the digital image may be received in any of a number of image formats. Thus, the system may compare features within the image with other received digital image data, thereby improving the quality of any classifications or evaluations of the digital image and its authenticity. Moreover, by generating a vector representation of the digital image, the system may prepare the digital image so that it may be classified by an image recognition model, further improving the accuracy and efficiency of classification tasks.

In some embodiments, the system may determine a probability of authenticity based on a model (e.g., based on an image recognition convolutional neural network model). As referred to herein, a "probability of authenticity" may include any evaluation of a likelihood or confidence that a given image of a document is authentic. For example, the system may determine the likelihood that a received driver's license is authentic, based on training an image recognition convolutional neural network model with other document images and authentication statuses. In some embodiments, the system may compare the probability of authenticity with a threshold probability of authenticity before deciding whether the likelihood that a document is authentic is suitably high. In some embodiments, the threshold probability of authenticity may depend on the document type or the version type. For example, a document that has historically been easily forged and falsified may require a higher probability of authenticity before a positive authentication status is determined. By determining a probability of authenticity, the system may evaluate an image of a document dynamically without human input and may determine an authentication status based on experience with past authentication decisions and previously received images. Thus, the system improves the accuracy and efficiency of any determinations of authentication statuses of documents.

The system may determine an overlap metric between portions of the digital image corresponding to different rulesets. As referred to herein, an "overlap metric" may include a measure of similarity between information and corresponding placement of this information associated with two document types. For example, the system may calculate an overlap metric between two versions of the same type of document. The system may determine the location of information (e.g., a plurality of sets of pixel coordinate ranges) within the first version of the document, as well as the location of information within a second version of the document. The system may determine areas associated with these locations, and determine the extent to which these areas overlap with each other. Thus, the system may determine how similar two design standards are from one another, based on whether the placement of information largely overlaps. The system may compare this overlap metric with a threshold overlap metric, in order to determine whether the two versions are equivalent, or whether the ruleset may need to be updated within the image ruleset database. By doing so, the system may track whether the design of a document has changed or been updated over time, and whether to adapt the rules accordingly. Thus, the system may deal with dynamically received documents (e.g., newly updated driver's licenses), even if the system has not received such documents in the past, and may still handle, process, and evaluate the information upon these documents.

Figure 3:
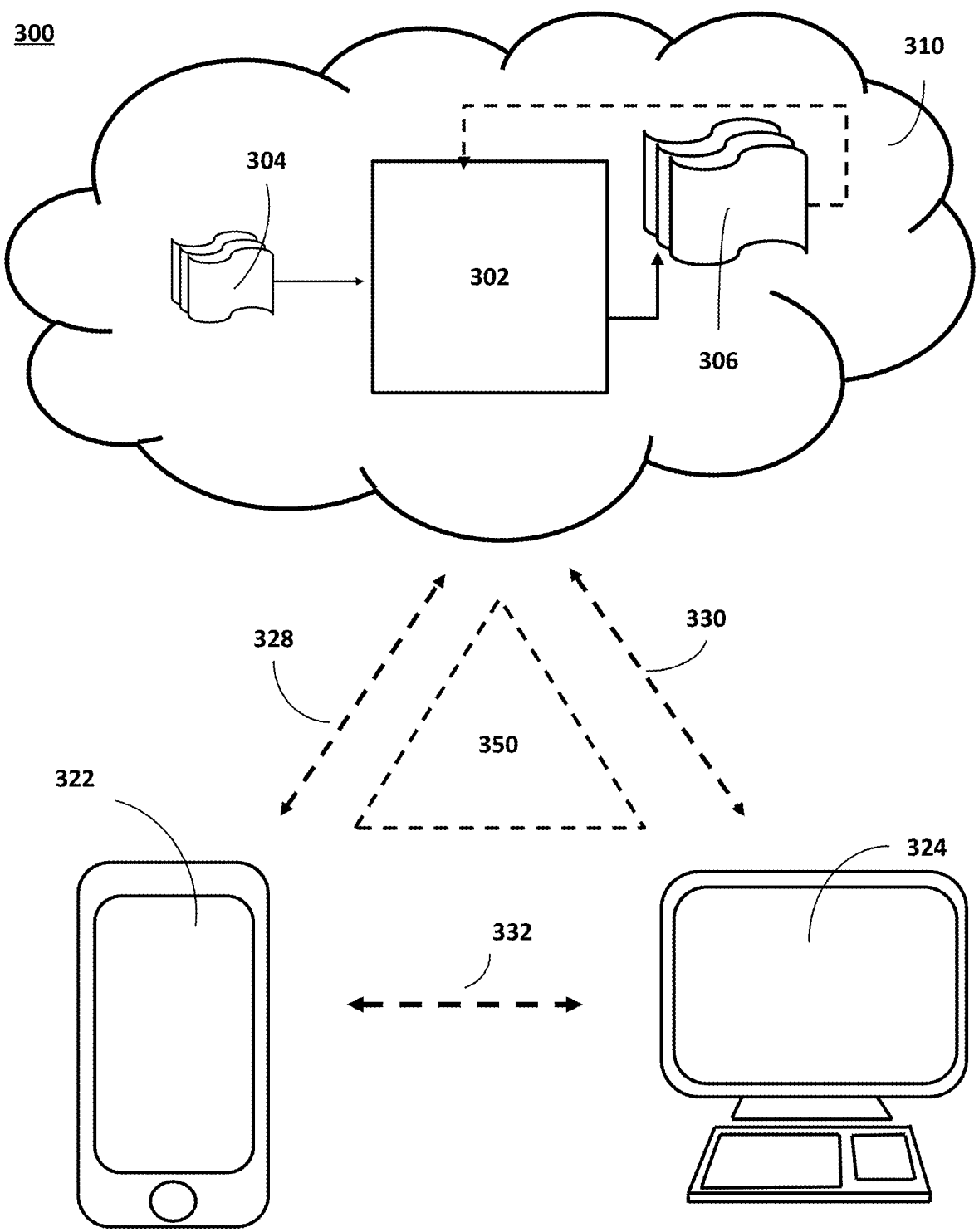
FIG. 3 shows illustrative components for a system that utilizes one or more machine learning models to dynamically extract and validate data from identification documents received over a computer network, in accordance with one or more embodiments.

FIG. 3 shows illustrative components for a system used to dynamically validate and extract data from images of identification documents received over computer network communications, in accordance with one or more embodiments. For example, FIG. 3 may show illustrative components for determining the authenticity and/or validity of an image of a driver's license for identification of a document holder. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include digital image data, including digital images and metadata associated with the digital image. For example, cloud components 310 may include an image of a province driver's license (as shown in FIG. 1). In some embodiments, cloud components 310 may include image ruleset database 200, as shown in FIG. 2, including rulesets corresponding to document types and document versions. Cloud components 310 may access previously processed digital images, as well as associated labels.

Cloud components 310 may access databases relating to document and/or document holder verification, such as identity data (e.g., from a credit agency), or design standards data from state governments. For example, cloud components 310 may communicate with servers, client devices, and other devices in order to validate rulesets (e.g., through a validation request and validation message).

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a prediction of a probability of authenticity of a given document, or a classification of a document type corresponding to a given digital image).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem-solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., document types, such as whether a given digital image corresponds to a driver's license, passport, or other identification document).

In some embodiments, the model (e.g., model 302) may automatically perform actions based on outputs 306. In some embodiments, the model (e.g., model 302) may not perform any actions. The output of the model (e.g., model 302) may be used to determine an authentication status, determine a document type, and/or generate a ruleset based on the authentication data within the document.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a representational state transfer (REST) or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of their operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of the API layer 350 may provide integration between front-end layer and back-end layer. In such cases, API layer 350 may use RESTful APIs (exposition to front-end layer or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
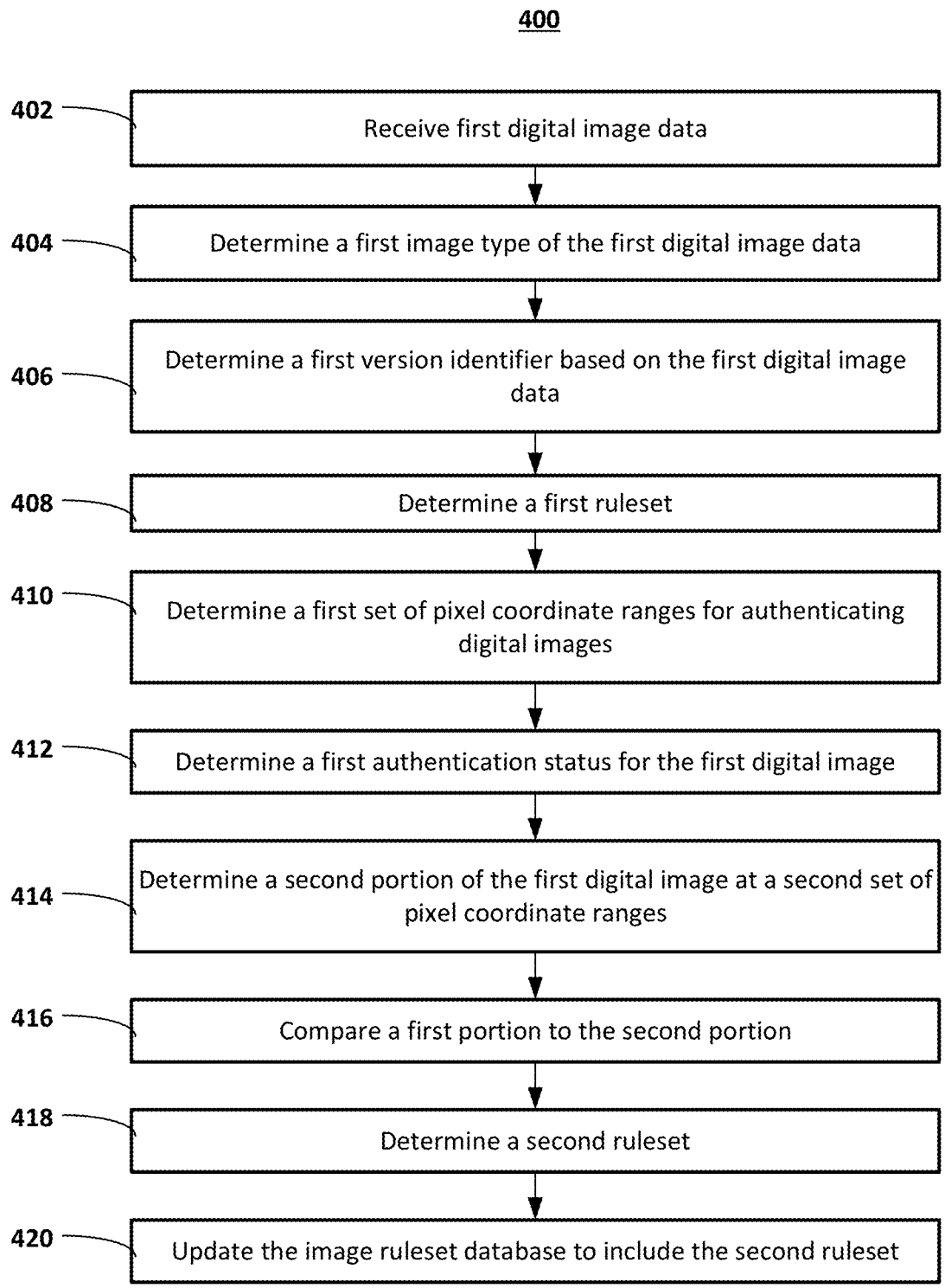
FIG. 4 shows a flowchart of the steps involved in dynamically extracting and validating data from identification documents received over a computer network, in accordance with one or more embodiments.

FIG. 4 shows a flowchart of the steps involved in extracting and validating digital image data corresponding to documents received dynamically, in accordance with one or more embodiments. For example, the system may use process 400 (e.g., as implemented on one or more system components described above) in order to determine the validity of a driver's license, as well as whether information on the driver's license corresponds to the claimed document holder, even if the particular style or version of the driver's license has not been previously encountered.

At step 402, process 400 (e.g., using one or more of the components described above) may receive digital image data over a computer network. That is, the system may receive first digital image data over a computer network, wherein the first digital image data includes a first digital image. For example, the system may receive a digital image (e.g., in the format of a bitmap), as well as associated metadata, including information about who captured the image, when it was captured, and what device was used, for example. By receiving digital image data, the system gains sufficient information to validate the information in the image, including whether the image may have been falsified or forged, or whether the image belongs to the claimed holder of the image. The digital image may include an image of a document (e.g., an identification document). Thus, by receiving the digital image, the system may extract data from and authenticate any documents submitted through the computer network dynamically, as they are received.

At step 404, process 400 (e.g., using one or more of the components described above) may determine a first image type of the first digital image data. The system may determine the type of document that is imaged within the digital image data and corresponding digital image. For example, the system may determine that the imaged document is one of a driver's license from California. Accordingly, the system may assign a document type that corresponds to this assessment. By doing so, the system may use the document type to determine how to analyze the image. As each document type may have different requirements, security features, or embodied information, deducing the document type enables the system to determine which features to look for and, thus, may enable a more streamlined analysis of the image. Additionally or alternatively, a particular document type may have already been encountered previously. Thus, by deducing the image's document type, the system may leverage previously received documents of the same type to improve the accuracy or efficiency of any analysis or evaluation of the document.

In some embodiments, the system may determine the first image type of the first digital image using an OCR model. That is, the system may generate, using an OCR model, a plurality of alphanumeric strings from the first digital image. The system may determine a title text string from the plurality of alphanumeric strings and, based on the title text string, determine the first image type. For example, the system may identify any or all text included in the digital image of the document using an OCR model, and generate a plurality of text strings (e.g., alphanumeric strings) based on this. Subsequently, the system may use a natural language processing model to determine which of these alphanumeric strings is likely to include the title of the document. For example, a string including the words "California Driver's License" (or, for example, field 116 in FIG. 1) may be determined to be a title text string. Based on this determination, the system may generate the image type. By utilizing OCR to determine the title string, the system may determine document types corresponding to image types that have not been received previously, such as documents for which the system has not previously gathered information. By doing so, the system may handle document types that are dynamically received, and determine document types immediately without a tedious review process.

In some embodiments, the system may determine the first image type of the first digital image using an image recognition convolutional neural network model. That is, the system may input, into an image recognition convolutional neural network model, the first digital image, wherein the image recognition convolutional neural network model was trained with images of identification documents and labels indicating document types. The system may generate, from the image recognition convolutional neural network model, the first image type. For example, the system may extract a digital image from the digital image data and prepare this image into a model-readable format. The system may process this formatted data through an image recognition convolutional neural network and generate a classification for the image based on, for example, previously received images of identification documents and associated labels. By doing so, the system may determine an image type based on machine learning, thereby leveraging previous experience with extracting and validating data to label subsequently received data. Thus, the system may handle documents of types that have already been encountered more accurately and efficiently based on machine learning model results, without re-analyzing the document through OCR, for example.

At step 406, process 400 (e.g., using one or more components described above) may determine a first version identifier based on the first digital image data. For example, the system may determine a version of an identity document (e.g., a driver's license) that corresponds to the received digital image. As issuing authorities may update driver's license designs often, a version identifier enables the system to monitor and track any such updates and handle received documents or images accordingly. For example, the system may determine that an image of a received driver's license corresponds to a version from the 1990s and may assign a version type accordingly. In some embodiments, the version identifier may not include a temporal marker, but a type of identification; for example, a California Driver's License may have a "REAL ID" designation and, as a result, different design standards. By determining a version type, the system may handle changes and modifications to design standards for licenses and, as such, may handle dynamically received document images, even if standards have changed.

In some embodiments, the system may determine the first version identifier using an OCR model. That is, the system may generate, using an OCR model, a plurality of alphanumeric strings from the first digital image. The system may determine an issue year from the plurality of alphanumeric strings and, based on the issue year, determine the first version identifier. For example, the system may determine the plurality of alphanumeric strings that may include text or numbers on the document, and may determine which of these fields may correspond to an "issue date." The system may parse the issue date for a year, and determine the issue year accordingly. The system may compare the issue year against a database of design standards or, in some embodiments, may utilize previously received images, in order to determine a version identifier for the document. For example, the system may determine that a "Valid from" date corresponds to an issue date, with an issue year of 2019. The system may determine that California licenses between the year 2000 and 2020 were all of the same design and, thus, determine a version identifier that identifies the document as part of this series of licenses. By doing so, the system may track any changes in versions and may associate documents with other documents that have similar design standards. Accordingly, the system may more efficiently process the received document according to any known rules or information corresponding to the determined document type and version identifier.

At step 408, the system may determine a first ruleset. That is, based on the first image type and the first version identifier, the system may determine a first ruleset from an image ruleset database, for processing the first digital image data, wherein the image ruleset database comprises a plurality of rulesets for dynamically validating and extracting inputted data corresponding to predetermined image types and predetermined version identifiers. For example, the system may look for a match in image type field 202 and/or version ID field 204, and determine a ruleset based on a match. The system may look for similar matches that may have been labeled differently, using fuzzy logic, for example. By determining a ruleset based on the image type and version identifier, the system may leverage previous data regarding authentication requirements, such as the position of authentication data and verification markers on the document, thereby improving the efficiency of data verification and extraction from the document. Additionally, by referring to an image ruleset database, the system may determine which elements to identify in order to certify document authenticity or validity, thereby improving the accuracy of any determinations of the document's authentication status.

At step 410, process 400 (e.g., using one or more components described above) may determine a first set of pixel coordinate ranges for authenticating digital images. That is, the system may determine, based on the first ruleset, a first set of pixel coordinate ranges for authenticating digital images having the first image type and the first version identifier. For example, the system may, using the image ruleset database, determine rules relating to the position and existence of authentication elements, authentication status identifiers, or other authentication data within the document. For example, the system may determine the location (e.g., coordinates) of the name, date of birth, and expiration date fields of the document, as well as any expected verification markers (e.g., watermarks). By doing so, the system may leverage previously encountered images and authentication information in order to dynamically validate newly received documents as they are received, without waiting for human intervention or manual labeling. Thus, the system may know where to look for relevant authentication data, streamlining data extraction and subsequent validation of the information.

At step 412, process 400 (e.g., using one or more components described above) may determine a first authentication status for the first digital image. That is, based on determining the first ruleset, the system may determine a first authentication status for the first digital image based on processing a first portion of the first digital image at the first set of pixel coordinate ranges, wherein the first authentication status comprises an indication of document authenticity. For example, the system may process the received image according to rules in the ruleset—the system may determine a first portion that corresponds to the first set of pixel coordinate ranges, and determine whether the corresponding element stated in the ruleset is present. In some embodiments, the system may determine whether any verification markers are of the right color, shape, or appearance. By determining an authentication status based on the ruleset, the system may leverage data regarding the security features of a given document and version and, therefore, make a determination of an authentication status without manual intervention. Thus, the system enables dynamic handling of data extraction and subsequent validation for dynamically received digital images of documents.

In some embodiments, the system may determine the first authentication status by extracting security data from the image and comparing this data with authentication conditions. That is, the system may extract security data from the first portion of the first digital image. The system may retrieve a plurality of authentication conditions from the first ruleset. The system may compare the security data with each authentication condition from the plurality of authentication conditions. Based on comparing the security data with each authentication condition from the plurality of authentication conditions, the system may determine the first authentication status. For example, the system may retrieve a set of conditions that must be fulfilled before authentication is possible, based on the ruleset. These conditions may include expiration date criteria, requirements relating to inclusion of particular verification markers, or issue date requirements, for example. The system may extract the relevant security data directly from the image and compare these with any requirements stated in the image ruleset database, thereby enabling validation of such authentication conditions. Accordingly, the system may assign an authentication status to the received image of the document. By comparing data from the image to authentication conditions, the system may make a more secure, accurate determination of the validity of a given document.

In some embodiments, the system may determine an authentication status by determining the inclusion of an authentication element. That is, the system may retrieve, from the first ruleset, a first authentication element, wherein the first authentication element is associated with the first set of pixel coordinate ranges. The system may determine that the first portion of the first digital image includes the first authentication element at the first set of pixel coordinate ranges. Based on determining that the first portion of the first digital image includes the first authentication element, the system may generate a confirmation that the first digital image is authentic. For example, the system may determine a list of required authentication elements (e.g., data relating to the document holder, such as a name, date of birth, and picture) and scan the document for their inclusion, as well as whether they are in the expected portion of the document (e.g., consistent with the sets of pixel coordinate ranges). In some embodiments, the system may compare or cross-reference the authentication elements with other known information regarding the document holder, such as biometric information. By doing so, the system may ensure that any authentication elements are not only present, but also consistent with expected values or requirements. Thus, the system may streamline the authentication process by isolating only elements that are required for authentication, without relying on manual labelers. Thus, the system may process and authenticate documents dynamically as they are received.

In some embodiments, the system may determine the first authentication status through determining a probability of authenticity based on a convolutional neural network. That is, the system may generate a vector representation of the first digital image and input the vector representation into a convolutional neural network for determining a probability of authenticity. Based on inputting the vector representation into the convolutional neural network, the system may generate the probability of authenticity for the first digital image. Based on the probability of authenticity, the system may determine the first authentication status. For example, the system may generate vector representations of the digital image such that they are comparable with previously received images and formatted such that they may be accepted by a convolutional neural network model. Thus, the system may input these vector representations into a convolutional neural network model, which may determine a probability of authenticity for the image. For example, the convolutional neural network may have been trained with images of previous documents that have either been authenticated or shown to be unauthentic. Thus, the system may determine a probability of authenticity and assign an authentication status based on this calculation. In some embodiments, the system may compare the probability of authenticity with a threshold probability of authenticity, which may enable the system to assign authentication statuses based on likelihood of authenticity. As a result, the system may learn from previous images and authentication statuses, thereby continually adapting and enabling dynamic classification of further received images on the basis of authenticity.

At step 414, process 400 (e.g., using one or more components described above) may determine a second portion of the first digital image at a second set of pixel coordinate ranges. That is, based on the first authentication status, the system may determine a second portion of the first digital image at a second set of pixel coordinate ranges, wherein the second set of pixel coordinate ranges indicates the second portion of the first digital image that includes authentication data. For example, if the system determines that authentication was not able to be completed based on the first ruleset, the system may determine a portion of the first image that includes authentication data, even if this data does not correspond to data that would be expected according to the first ruleset. For example, the system may detect that there are name and date of birth fields in a portion of the document that are not indicated in the ruleset through OCR models, and/or natural language processing models. By detecting another portion of the document that may include authentication data, the system may ensure that, even if a document does not match a previously identified ruleset, any authentication data may be evaluated. By doing so, the system may learn from newly received images of documents and determine locations of authentication data within a document for processing of future images that are received with the same document type and/or version identifier.

In some embodiments, the system may determine the second portion of the first digital image using OCR. That is, the system may determine, using OCR, a text field on the first digital image. The system may determine that the text field includes the authentication data. Based on determining that the text field includes the authentication data, the system may determine the second set of pixel coordinate ranges based on a location of the text field on the first digital image. For example, the system may detect, using OCR, that there is text in the document outside of portions of the document that the ruleset specifies. In response, the system may parse these text fields and determine if the text fields include authentication data (such as identifiers of the document holder or markers/symbols that verify the authenticity of the document). For example, the system may determine whether text within a text field corresponds to authentication data using a natural language processing model, or by comparing these text fields with a database of design standards for the document. By identifying portions of the document that include authentication data, and determining the corresponding locations (e.g., sets of pixel coordinate ranges), the system may learn about relevant portions of the document to data extraction and authentication, even if the system has not received such a document in the past. By doing so, the system may dynamically handle incoming document images and detect authentication data without required intervention, even for unfamiliar documents.

At step 416, process 400 (e.g., using one or more components described above) may compare the first portion to the second portion. For example, the system may compare the first portion (i.e., the portion of the document that should include authentication data according to the ruleset) and the second portion (i.e., portions of the document that have been detected to include authentication data). By doing so, the system may determine any differences between the ruleset and the received image and, by doing so, identify how the inclusion or placement of authentication elements may have changed. Thus, the system may adapt to changes in security features in documents, for example, based on comparing the placement of authentication data in the document.

In some embodiments, comparing the first portion to the second portion may include calculating an overlap metric. That is, the system may determine a common set of pixel coordinate ranges, wherein the first set of pixel coordinate ranges and the second set of pixel coordinate ranges both encapsulate the common set of pixel coordinate ranges. The system may determine a first area associated with the first set of pixel coordinate ranges, a second area associated with the second set of pixel coordinate ranges, and a third area associated with the common set of pixel coordinate ranges. The system may calculate an overlap metric between the first set of pixel coordinate ranges and the second set of pixel coordinate ranges based on the first area, the second area, and the third area. The system may compare the overlap metric with a threshold overlap metric. For example, the system may determine how much of the portion in which authentication data was found (i.e., the second portion) overlaps with the portion (i.e., the first portion) where authentication was expected, according to the ruleset. If the overlap between these portions is high, then the system may determine that it is likely that the document is not a new version, as the information is in a similar position. If the overlap metric is low, the system may determine that there has been an update to design standards for the license and, accordingly, may decide to update the image ruleset database. Thus, by calculating an overlap metric and comparing this value with a threshold value, the system may further evaluate the security features and design standards of the received image and process further information accordingly, enabling improved efficiency and accuracy in authentication status determination.

At step 418, process 400 (e.g., using one or more components described above) may determine a second ruleset. That is, based on comparing the first portion to the second portion, the system may determine a second ruleset for processing the first digital image data. For example, the system may determine that, if there is low overlap between the two portions, that the rules for the given document type need to be updated. For example, based on the overlap metric, the system may determine that the ruleset is not consistent with the actual position of authentication data on the image of the document and, accordingly, determine a second ruleset that is consistent with the received document. For example, the second ruleset may include a list of authentication elements with their updated positions (e.g., sets of pixel coordinate ranges). By doing so, the system may adapt to documents that have been modified or updated, thereby streamlining the authentication process even in situations where design standards are unknown or modified.

In some embodiments, the system may determine an authentication status based on the second ruleset. That is, the system may determine a second authentication status based on the second ruleset and generate, for display on a user interface, a confirmation of the second authentication status. For example, the system may determine whether the received document satisfies the requirements of the second ruleset, even if not the first ruleset. By doing so, the system may authenticate documents, even if the first ruleset was not consistent with the document. Thus, the system may dynamically validate images of documents. By generating the authentication status for display on a user interface, the system may generate visible confirmation of the authentication status of the document, such that the user may take additional actions depending on the authentication status. For example, in some embodiments, if a document was unable to be authenticated according to the second ruleset, the system may enable a user to upload an alternative document instead. Thus, by generating an authentication status based on the second ruleset and enabling this status to be displayed, the system provides information to the user regarding the validity of the received document and provides the user with an opportunity to correct any issues.

In some embodiments, the system may determine the second authentication status based on the second ruleset by retrieving and identifying authentication status identifiers on the image of the document. That is, the system may retrieve, from the second ruleset, authentication status identifiers corresponding to the first image type. The system may process a plurality of portions of the first digital image for inclusion on one or more of the authentication status identifiers. The system may detect one or more of the authentication status identifiers in the second portion. For example, the system may detect security features, such as validation markers, watermarks, or other symbols that ensure the security of the card and compare these with authentication status identifiers corresponding to the first image type. By doing so, the system may authenticate the document even if the document is discovered to be an updated or modified version. Thus, the system may enable dynamic processing of received documents, even if security features are in different locations due to updated design standards.

In some embodiments, the system may determine the second authentication status by generating a validation request and receiving a validation message. That is, the system may generate a validation request to validate the second ruleset, where the validation request includes the second ruleset. The system may transmit, to a user device on the computer network, the validation request. The system may receive, from the user device, a validation message, wherein the validation message includes an indication of a validity of the second ruleset. For example, the system may submit a request to a user device (or, in some embodiments, a server) to validate the second ruleset, including the authentication data found within the image and corresponding locations (e.g., sets of pixel coordinate ranges). The user device or server may, for example, check a database or a press release from an issuing authority in order to determine whether the relevant authentication data is indeed in the correct location on the document, as per design standards or legal requirements. Thus, the system may receive a corresponding validation message confirming the validity of this ruleset. By doing so, the system may generate new rulesets through the received image of a document and validate these rulesets through authorized sources, thereby enabling dynamic validation of received documents without requiring manual authentication.

In some embodiments, the system may determine the second ruleset by combining the pixels corresponding to the first and second portions of the document. That is, the system may determine a third set of pixel coordinate ranges that includes the first set of pixel coordinate ranges and the second set of pixel coordinate ranges. The system may determine a plurality of authentication elements included in the first portion of the first digital image and the second portion of the first digital image. The system may generate the second ruleset to include the third set of pixel coordinate ranges and the plurality of authentication elements. For example, the system may determine that, while the first ruleset properly describes many authentication features or elements in the image, additional elements were found. For example, some documents may have additional security features depending on the document holder, such as additional biometric information (e.g., a restriction on whether glasses are required for driving). Thus, the system may generate an updated ruleset by combining the additional authentication data that was found (i.e., found within the second set of pixel coordinate ranges) with the original ruleset, and creating a third set of pixel coordinate ranges that include both rulesets. Thus, the system may handle updating rulesets even for small modifications or additions of authentication information.

In some embodiments, the system may determine the second ruleset by only including the second set of pixel coordinate ranges and associated authentication elements. That is, the system may determine a plurality of authentication elements included in the second portion of the first image. The system may generate the second ruleset to include the second set of pixel coordinate ranges and the plurality of authentication elements. For example, the system may determine that the first ruleset is not relevant to the received document because little authentication data is stored in the first set of pixel coordinate ranges according to the first ruleset. Thus, the system may update the ruleset (i.e., generate the second ruleset) using the second set of pixel coordinate ranges, corresponding to where authentication data was found in the image itself. Thus, the system may update rulesets for authenticating and validating identification document data, even if the changes in authentication or security features are substantial.

At step 420, process 400 (e.g., using one or more components described above) may update the image ruleset database to include the second ruleset. For example, the system may append a record of the second ruleset to the image ruleset database in a row corresponding to the first image type, and may generate a new version identifier corresponding to the new ruleset and the received digital image. Thus, by storing this information in an accessible database, the system may include any information or knowledge that was gained from authenticating the first digital image and apply this information to further authentication decisions in the future. By doing so, the system may adapt to dynamically received images of documents and update handling of such documents as needed.

In some embodiments, the system may receive second digital image data and determine a second authentication status based on the first digital image data. That is, the system may receive second digital image data, wherein the second digital image data includes a second digital image. Based on receiving the second digital image data, the system may generate a second image type and a second version identifier. The system may determine that the second image type matches the first image type and that the second version identifier matches the first version identifier. Based on determining that the second image type matches the first image type and that the second version identifier matches the first version identifier, the system may generate, for the second digital image data, a second authentication status based on the second ruleset. For example, the system may determine that a second image corresponds to the same image type and version identifier as was previously determined from the first image. Thus, the system may generate an authentication status based on the ruleset corresponding to the first digital image (i.e., the second ruleset). Thus, the system may learn from previously received digital images and leverage this information for further dynamically received images, thereby improving the efficiency and accuracy of extracting data from and authenticating received images of documents.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The present techniques will be better understood with reference to the following enumerated embodiments:

1. A method, the method comprising: receiving first digital image data over a computer network, wherein the first digital image data comprises a first digital image of an identification document; determining a first image type of the first digital image data, wherein the first image type indicates an issuing authority for the identification document; determining a first version identifier based on the first digital image data, wherein the first version identifier indicates a design standard for the identification document; based on the first image type and the first version identifier, determining a first ruleset, from an image ruleset database, for processing the first digital image data, wherein the image ruleset database comprises a plurality of rulesets for dynamically validating and extracting inputted data corresponding to predetermined image types and predetermined version identifiers; determining, based on the first ruleset, a first set of pixel coordinate ranges for authenticating digital images having the first image type and the first version identifier, wherein the first set of pixel coordinate ranges indicates portions of the first digital image that comprise identification data and security features; based on determining the first ruleset, determining a first authentication status for the first digital image based on processing a first portion of the first digital image at the first set of pixel coordinate ranges, wherein the first authentication status comprises an indication of document authenticity; based on the first authentication status, determining a second portion of the first digital image at a second set of pixel coordinate ranges, wherein the second set of pixel coordinate ranges indicates the second portion of the first digital image that includes authentication data; comparing the first portion to the second portion; based on comparing the first portion to the second portion, determining a second ruleset for processing the first digital image data, wherein the second ruleset comprises a third set of pixel coordinate ranges corresponding to an addition of the first set of pixel coordinate ranges and the second set of pixel coordinate ranges; updating the image ruleset database to include the second ruleset; based on determining a third portion of the first digital image at the third set of pixel coordinate ranges, determining a second authentication status based on the second ruleset; and generating, for display on a user interface, an indication of the second authentication status.

2. The method comprising: receiving first digital image data over a computer network, wherein the first digital image data comprises a first digital image; determining a first image type of the first digital image data; determining a first version identifier based on the first digital image data; based on the first image type and the first version identifier, determining a first ruleset, from an image ruleset database, for processing the first digital image data, wherein the image ruleset database comprises a plurality of rulesets for dynamically validating and extracting inputted data corresponding to predetermined image types and predetermined version identifiers; determining, based on the first ruleset, a first set of pixel coordinate ranges for authenticating digital images having the first image type and the first version identifier; based on determining the first ruleset, determining a first authentication status for the first digital image based on processing a first portion of the first digital image at the first set of pixel coordinate ranges; based on the first authentication status, determining a second portion of the first digital image at a second set of pixel coordinate ranges, wherein the second set of pixel coordinate ranges indicates the second portion of the first digital image that includes authentication data; comparing the first portion to the second portion; based on comparing the first portion to the second portion, determining a second ruleset for processing the first digital image data; and updating the image ruleset database to include the second ruleset.

3. The method of any one of the preceding embodiments, further comprising: determining a second authentication status based on the second ruleset; and generating, for display on a user interface, a confirmation of the second authentication status.

4. The method of any one of the preceding embodiments, wherein determining the second authentication status based on the second ruleset comprises: retrieving, from the second ruleset, authentication status identifiers corresponding to the first image type; processing a plurality of portions of the first digital image for inclusion of one or more of the authentication status identifiers; and detecting one or more of the authentication status identifiers in the second portion.

5. The method of any one of the preceding embodiments, wherein determining the second authentication status based on the second ruleset comprises: generating a validation request to validate the second ruleset, wherein the validation request comprises the second ruleset; transmitting, to a user device on the computer network, the validation request; and receiving, from the user device, a validation message, wherein the validation message comprises an indication of a validity of the second ruleset.

6. The method of any one of the preceding embodiments, wherein determining the first image type of the first digital image data comprises: generating, using an OCR model, a plurality of alphanumeric strings from the first digital image; determining a title text string from the plurality of alphanumeric strings; and based on the title text string, determining the first image type.

7. The method of any one of the preceding embodiments, wherein determining the first image type of the first digital image data comprises: inputting, into an image recognition convolutional neural network model, the first digital image, wherein the image recognition convolutional neural network model was trained with images of identification documents and labels indicating document types; and generating, from the image recognition convolutional neural network model, the first image type.

8. The method of any one of the preceding embodiments, wherein determining the first version identifier of the first digital image data comprises: generating, using an OCR model, a plurality of alphanumeric strings from the first digital image; determining an issue year from the plurality of alphanumeric strings; and based on the issue year, determining the first version identifier.

9. The method of any one of the preceding embodiments, further comprising: receiving second digital image data, wherein the second digital image data comprises a second digital image; based on receiving the second digital image data, generating a second image type and a second version identifier; determining that the second image type matches the first image type and that the second version identifier matches the first version identifier; and based on determining that the second image type matches the first image type and that the second version identifier matches the first version identifier, generating, for the second digital image data, a second authentication status based on the second ruleset.

10. The method of any one of the preceding embodiments, wherein determining the first authentication status comprises: extracting security data from the first portion of the first digital image; retrieving a plurality of authentication conditions from the first ruleset; comparing the security data with each authentication condition from the plurality of authentication conditions; and based on comparing the security data with each authentication condition from the plurality of authentication conditions, determining the first authentication status.

11. The method of any one of the preceding embodiments, wherein determining the first authentication status comprises: retrieving, from the first ruleset, a first authentication element, wherein the first authentication element is associated with the first set of pixel coordinate ranges; determining that the first portion of the first digital image includes the first authentication element at the first set of pixel coordinate ranges; and based on determining that the first portion of the first digital image includes the first authentication element, generating a confirmation that the first digital image is authentic.

12. The method of any one of the preceding embodiments, wherein determining the first authentication status comprises: generating a vector representation of the first digital image; inputting the vector representation into a convolutional neural network for determining a probability of authenticity; based on inputting the vector representation into the convolutional neural network, generating the probability of authenticity for the first digital image; and based on the probability of authenticity, determining the first authentication status.

13. The method of any one of the preceding embodiments, wherein determining the second portion of the first digital image comprises: determining, using OCR, a text field on the first digital image; determining that the text field comprises the authentication data; and based on determining that the text field comprises the authentication data, determining the second set of pixel coordinate ranges based on a location of the text field on the first digital image.

14. The method of any one of the preceding embodiments, wherein comparing the first portion to the second portion comprises: determining a common set of pixel coordinate ranges, wherein the first set of pixel coordinate ranges and the second set of pixel coordinate ranges both encapsulate the common set of pixel coordinate ranges; determining a first area associated with the first set of pixel coordinate ranges, a second area associated with the second set of pixel coordinate ranges, and a third area associated with the common set of pixel coordinate ranges; calculating an overlap metric between the first set of pixel coordinate ranges and the second set of pixel coordinate ranges based on the first area, the second area, and the third area; and comparing the overlap metric with a threshold overlap metric.

15. The method of any one of the preceding embodiments, wherein, based on comparing the first portion to the second portion, determining the second ruleset comprises: determining a third set of pixel coordinate ranges that includes the first set of pixel coordinate ranges and the second set of pixel coordinate ranges; determining a plurality of authentication elements included in the first portion of the first digital image and the second portion of the first digital image; and generating the second ruleset to include the third set of pixel coordinate ranges and the plurality of authentication elements.

16. The method of any one of the preceding embodiments, wherein, based on comparing the first portion to the second portion, determining the second ruleset comprises: determining a plurality of authentication elements included in the second portion of the first digital image; and generating the second ruleset to include the second set of pixel coordinate ranges and the plurality of authentication elements.

17. A tangible, non-transitory, machine-readable medium storing instructions that, when executed by a data processing apparatus, cause the data processing apparatus to perform operations comprising those of any of embodiments 1-16.

18. A system comprising one or more processors; and memory storing instructions that, when executed by the processors, cause the processors to effectuate operations comprising those of any of embodiments 1-16.

19. A system comprising means for performing any of embodiments 1-16.

What is claimed is:

1. A system for dynamic data validation and data extraction from images of identification documents received over computer network communications, the system comprising:
one or more processors; and
one or more non-transitory, computer-readable media comprising instructions that, when executed by the one or more processors, cause operations comprising:
receiving, over a computer network, digital image data comprising a digital image of an identification document;
determining, using an image recognition convolutional neural network model, based on the digital image data, (i) a first image type of the digital image indicating an issuing authority for the identification document and (ii) a first version identifier indicating a design standard for the identification document;
selecting, based on the first image type and the first version identifier, a first ruleset, from an image ruleset database, for processing the digital image data, wherein the first ruleset indicates portions of the digital image expected to include identification data and security features for authenticating the identification document;
determining, based on the first ruleset, a first set of pixel coordinate ranges associated with the portions of the digital image expected to include the identification data and security features;
determining a first authentication status for the digital image indicating that the identification document was not authenticated based on the identification data and the security features being detected outside a first portion of the digital image corresponding to the first set of pixel coordinate ranges;
based on the first authentication status indicating that the identification document was detected outside the first portion of the digital image, determining a second portion of the digital image corresponding to a second set of pixel coordinate ranges within which the identification data and the security features were detected by the image recognition convolutional neural network model;
based on a comparison of the first portion and the second portion, determining a second ruleset for processing the digital image data comprising a third set of pixel coordinate ranges corresponding to an addition of the first set of pixel coordinate ranges and the second set of pixel coordinate ranges;
updating the image ruleset database to include the second ruleset;
determining, based on the second ruleset, a third portion of the digital image corresponding to the third set of pixel coordinate ranges;
determining a second authentication status for the digital image indicating that the identification document has been authenticated based on the identification data and the security features being detected within the third portion; and
generating, for display on a user interface, an indication of the second authentication status for the digital image.

2. A method comprising:
receiving first digital image data comprising a first digital image;
determining, based on the first digital image data, a first image type and a first version identifier of the first digital image;
selecting, based on the first image type and the first version identifier, a first ruleset, from an image ruleset database, for processing the first digital image data, wherein the first ruleset comprises a first set of pixel coordinate ranges where authentication data for authenticating the first digital image is expected to be located;
determining, based on the first ruleset, a first authentication status for the first digital image indicating that the authentication data failed to be detected within a first portion of the first digital image corresponding to the first set of pixel coordinate ranges;
determining, based on the first authentication status, a second portion of the first digital image corresponding to a second set of pixel coordinate ranges including the authentication data;
comparing the first portion and the second portion;
determining, based on the first portion and the second portion, a second ruleset for processing the first digital image data, wherein the second ruleset comprises a third set of pixel coordinate ranges indicating where the authentication data for authenticating digital images of the first image type and the first version identifier is expected to be located;
updating the image ruleset database to include the second ruleset; and
determining, based on the second ruleset, a second authentication status indicating that the first digital image was authenticated based on a third portion of the first digital image corresponding to the third set of pixel coordinate ranges including the authentication data.

3. The method of claim 2, further comprising:
generating, for display on a user interface, a confirmation of the second authentication status.

4. The method of claim 3, wherein determining the second authentication status based on the second ruleset comprises:
retrieving, from the second ruleset, authentication status identifiers corresponding to the first image type;
processing a plurality of portions of the first digital image for inclusion of one or more of the authentication status identifiers; and
detecting at least one of the authentication status identifiers in the second portion.

5. The method of claim 3, wherein determining the second authentication status based on the second ruleset comprises:
generating a validation request to validate the second ruleset, wherein the validation request comprises the second ruleset;
transmitting, to a user device on a computer network, the validation request; and
receiving, from the user device, a validation message comprising an indication of a validity of the second ruleset.

6. The method of claim 2, wherein determining the first image type and the first version identifier comprises:
generating, using an optical character recognition model, a plurality of alphanumeric strings from the first digital image; and
determining that an alphanumeric string of the plurality of alphanumeric strings represents a title text string, the first image type being determined based on the title text string.

7. The method of claim 2, wherein determining the first image type and the first version identifier comprises:

inputting, into an image recognition convolutional neural network model, the first digital image data, wherein the image recognition convolutional neural network model was trained with images of identification documents and labels indicating document types; and generating, from the image recognition convolutional neural network model, the first image type.

8. The method of claim 2, wherein determining the first image type and the first version identifier comprises:

generating, using an optical character recognition model, a plurality of alphanumeric strings from the first digital image;

determining that an alphanumeric string of the plurality of alphanumeric strings represents an issue year string, the first version identifier being based on the issue year string.

9. The method of claim 2, further comprising:

receiving second digital image data comprising a second digital image;

determining, based on the second digital image data, a second image type and a second version identifier of the second digital image; and determining based on the second image type matching the first image type and the second version identifier matching the first version identifier, determining, based on the second ruleset, a third authentication status for the second digital image.

10. The method of claim 2, wherein determining the first authentication status comprises:

extracting security data from the first portion of the first digital image;

retrieving a plurality of authentication conditions from the first ruleset; and determining, based on a comparison of the security data with each authentication condition from the plurality of authentication conditions, the first authentication status.

11. The method of claim 2, wherein determining the first authentication status comprises:

retrieving, from the first ruleset, a first authentication element associated with the first set of pixel coordinate ranges;

determining that the first portion includes the first authentication element at the first set of pixel coordinate ranges; and generating, based on the first portion including the first authentication element, a confirmation that the first digital image is authentic.

12. The method of claim 2, wherein determining the first authentication status comprises:

generating a vector representation of the first digital image;

inputting the vector representation into an image recognition convolutional neural network model to generate a probability of authenticity, wherein the first authentication status.

13. The method of claim 2, wherein determining the second portion comprises:

determining, using optical character recognition, a text field on the first digital image;

determining that the text field comprises the authentication data, wherein the second set of pixel coordinate ranges is selected based on a location of the text field on the first digital image.

14. The method of claim 2, wherein comparing the first portion and the second portion comprises:

determining a common set of pixel coordinate ranges encapsulated by both the first set of pixel coordinate ranges and the second set of pixel coordinate ranges;

determining a first area associated with the first set of pixel coordinate ranges, a second area associated with the second set of pixel coordinate ranges, and a third area associated with the common set of pixel coordinate ranges;

calculating an overlap metric between the first set of pixel coordinate ranges and the second set of pixel coordinate ranges based on the first area, the second area, and the third area; and comparing the overlap metric with a threshold overlap metric.

15. The method of claim 2, wherein determining the second ruleset comprises:

determining a third set of pixel coordinate ranges comprising the first set of pixel coordinate ranges and the second set of pixel coordinate ranges;

determining a plurality of authentication elements included in the first portion and the second portion; and generating the second ruleset comprising the third set of pixel coordinate ranges and the plurality of authentication elements.

16. The method of claim 2, wherein determining the second ruleset comprises:

determining that the second portion comprises a plurality of authentication elements; and generating the second ruleset comprising the second set of pixel coordinate ranges and the plurality of authentication elements.

17. One or more non-transitory, computer-readable media comprising instructions that, when executed by one or more processors, causes the one or more processors to perform operations comprising:

receiving first digital image data comprising a first digital image;

determining, based on the first digital image data, a first image type and a first version identifier of the first digital image data;

selecting, based on the first image type and the first version identifier, a first ruleset, from an image ruleset database, for processing the first digital image data, wherein the first ruleset comprises a first set of pixel coordinate ranges where authentication data for authenticating the first digital image is expected to be located;

responsive to determining, based on the first ruleset, a first authentication status indicting the authentication data failed to be detected within a first portion of the first digital image corresponding the first set of pixel coordinate ranges, determining a second portion of the first digital image corresponding to a second set of pixel coordinate ranges comprising the authentication data;

determining, based on a comparison of the first portion and the second portion, a second ruleset for processing the first digital image data, wherein the second ruleset comprises a third set of pixel coordinate ranges indicating where the authentication data for authenticating digital images of the first image type and the first version identifier is expected to be located;

updating the image ruleset database to include the second ruleset; and determining, based on the second ruleset, a second authentication status indicating that the first digital image was authenticated based on a third portion of the first digital image corresponding to the third set of pixel coordinate ranges including the authentication data.

18. The one or more non-transitory, computer-readable media of claim 17, wherein the operations further comprise:
  generating, for display on a user interface, a confirmation of the second authentication status.

19. The one or more non-transitory, computer-readable media of claim 17, wherein determining the first image type and the first version identifier comprises:
  generating, using an optical character recognition model, a plurality of alphanumeric strings from the first digital image; and
  determining that an alphanumeric string of the plurality of alphanumeric strings; represents a title text string, the first image type being determined based on the title text string.

20. The one or more non-transitory, computer-readable media of claim 17, wherein determining the first image type and the first version identifier comprises:
  inputting, into an image recognition convolutional neural network model, the first digital image data, wherein the image recognition convolutional neural network model was trained with images of identification documents and labels indicating document types; and
  generating, from the image recognition convolutional neural network model, the first image type.

* * * * *